Figure 1:
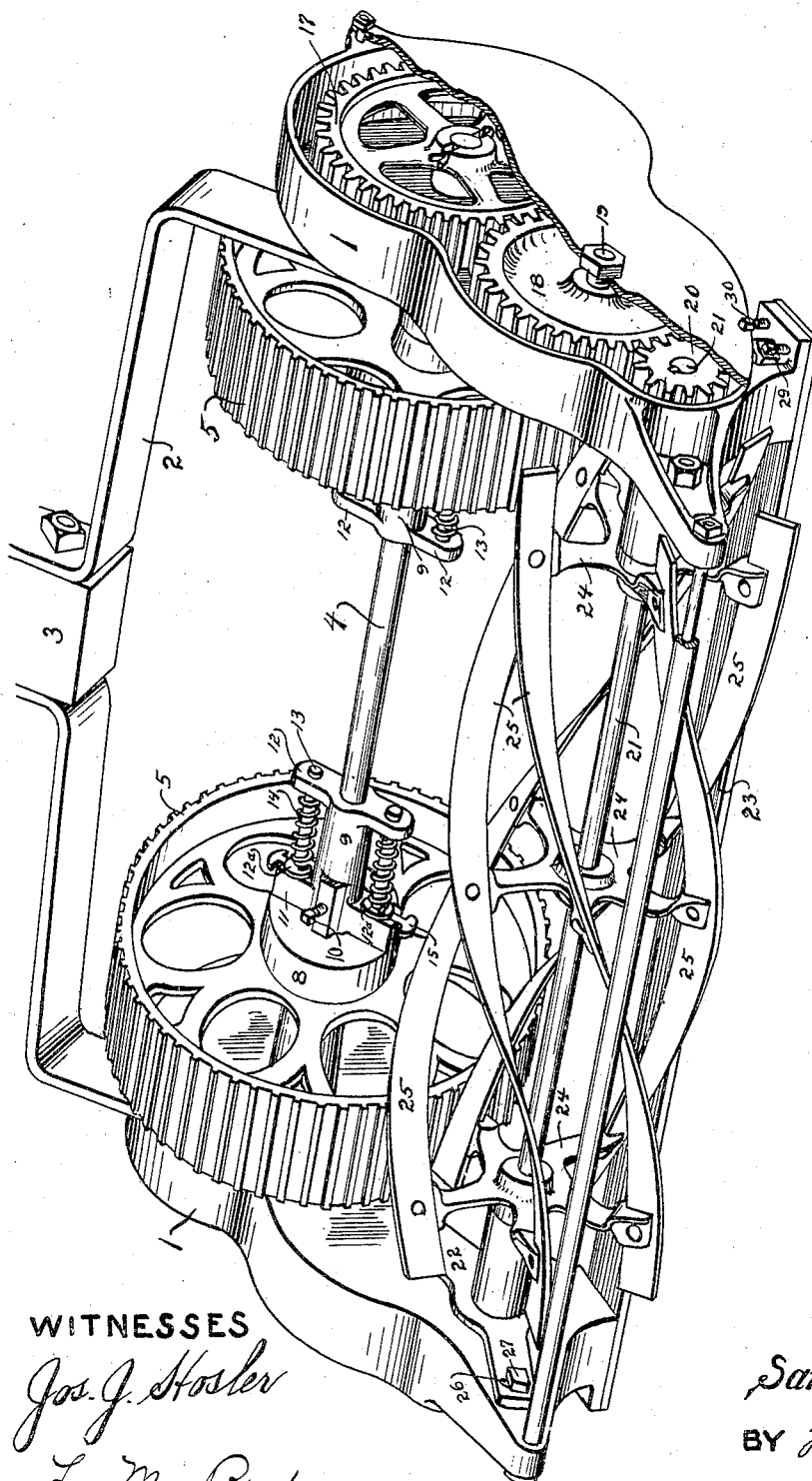

No. 789,158. PATENTED MAY 9, 1905.
S. P. LERCH.
LAWN MOWER.
APPLICATION FILED JAN. 30, 1905.

2 SHEETS—SHEET 1.

WITNESSES
Jos. J. Hosler
L. M. Bond

INVENTOR
Samuel P. Lerch.
BY F. W. Bond
ATTORNEY

No. 789,158. PATENTED MAY 9, 1905.
S. P. LERCH.
LAWN MOWER.
APPLICATION FILED JAN. 30, 1905.
2 SHEETS—SHEET 2.
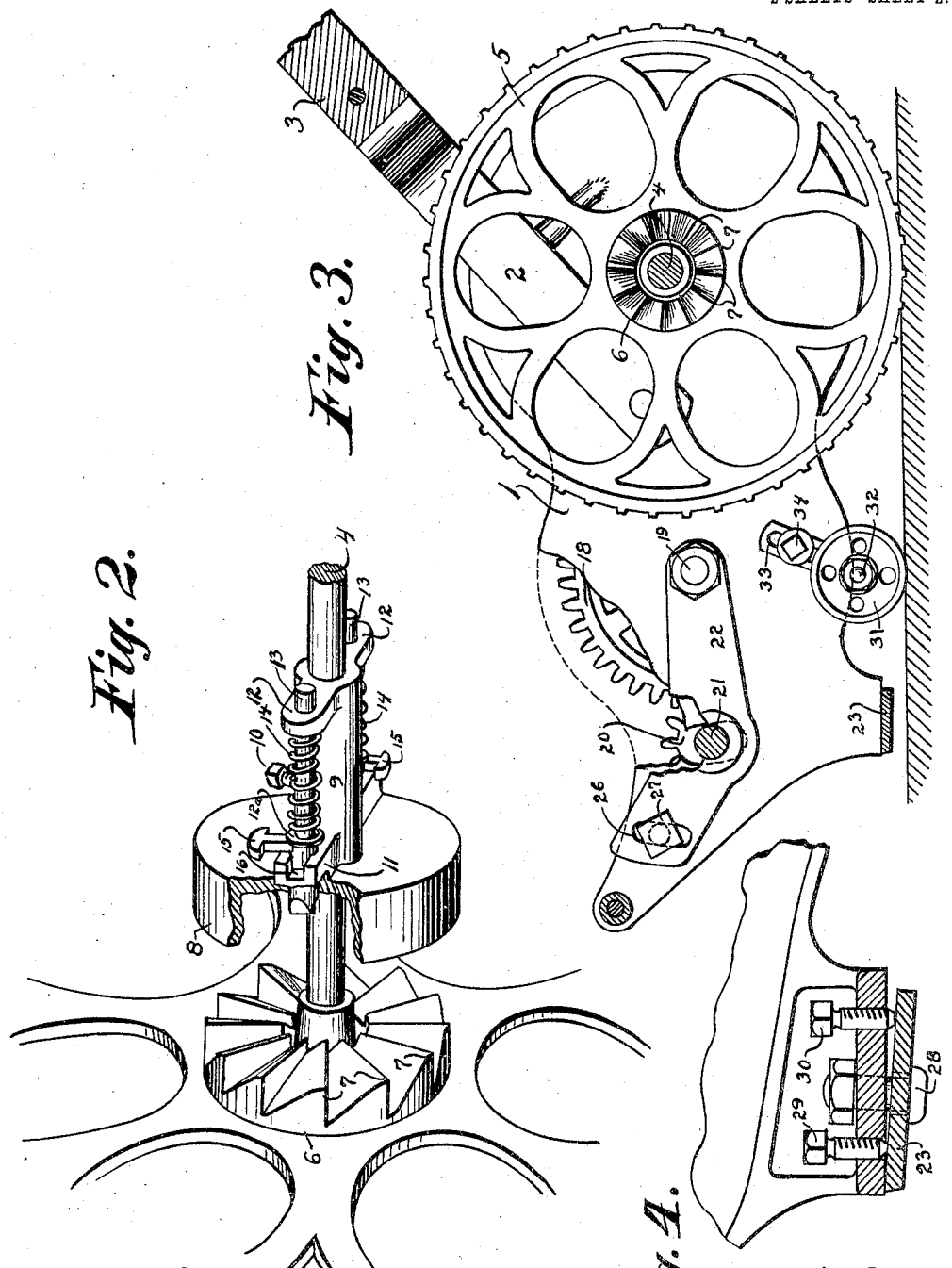
WITNESSES
Jos. J. Hosler.
L. M. Bond.
INVENTOR
Samuel P. Lerch
BY F. W. Bond
ATTORNEY No. 789,158.

Patented May 9, 1905.

UNITED STATES PATENT OFFICE.

SAMUEL P. LERCH, OF CANTON, OHIO.

LAWN-MOWER.

SPECIFICATION forming part of Letters Patent No. 789,158, dated May 9, 1905.

Application filed January 30, 1905. Serial No. 243,251.

*To all whom it may concern:*

Be it known that I, SAMUEL P. LERCH, a citizen of the United States, residing at Canton, in the county of Stark and State of Ohio, have invented certain new and useful Improvements in Lawn-Mowers; and I do hereby declare that the following is a full, clear, and exact description of the same, reference being had to the annexed drawings, making a part of this specification, and to the figures of reference marked thereon, in which—

Figure 1 is a perspective view showing the different parts properly assembled. Fig. 2 is a view showing the clutch mechanism and the different parts of the clutch detached. Fig. 3 is a transverse section showing the reel or clutch head removed. Fig. 4 is a view showing a portion of one of the side members and illustrating the shear-plate connected thereto.

The present invention has relation to lawn-mowers; and it consists in the novel arrangement hereinafter described, and particularly pointed out in the claim.

Similar numerals of reference indicate corresponding parts in all the figures of the drawings.

In the accompanying drawings, 1 represents the side members of the mower, which side members are held in parallel position in the usual manner and to which side members is attached the handle-yoke 2, which yoke is of the usual construction, to which is attached the handle 3, which handle is of the ordinary construction. In the side members 1 is journaled the main or driving shaft 4, upon which driving-shaft are loosely mounted the traveling wheels 5, which traveling wheels are of the usual construction. Upon each of the inner faces of the traveling wheels 5 is located the hub 6, which hub may be formed integral with the traveling wheels 5 and is provided with the clutched teeth 7. Upon the shaft 4 is securely attached the disk 8, which disk when properly located constitutes and forms a cover for the hub 6 and the clutch-teeth 7. For the purpose of providing a means for attaching the disk to the shaft 4 said disk is provided with the hub-like extension 9, which hub is provided with a set-screw 10, which set-screw is for the purpose of securely seating the hub upon the shaft 4, by which arrangement said hub and disk 8 revolves with the shaft 4 and the wheels 5 when the clutch proper is connected. The hub 9 is provided with the lateral arms 11 and 12, which arms receive the clutch-bolts 13, the inner ends of which are beveled in one direction, so as to allow a backward rotation of the wheels 5 independent of the shaft 4, the teeth 7 being beveled in such a direction that their faces will impart an endwise movement to the clutch-bolts 13 during the backward movement of the traveling wheels 5; but when the traveling wheels 5 move forward a rotary motion will be imparted to the disk 8, together with the shaft 4 and the different parts attached thereto. For the purpose of holding the clutch-bolts 13 in proper contact with the teeth 7 when the clutch is brought into action the springs 14 are provided, which springs are located between the arms 12 and the disks 12ª, as illustrated in Fig. 2. The clutch-bolts 13 are each provided with the lateral arms 15, and when it is desired to bring the clutch into action the arms 15 are seated in the recesses 16, formed in the arms 11; but when it is desired to throw the clutch out of action the clutch-bolts 13 are moved endwise and away from the teeth 7 a sufficient distance to allow the arms 15 to be brought against the adjacent faces of the arms 11, and thereby hold the clutch-bolts 13 out of contact with the teeth 7.

Upon the shaft 4 is securely attached the gear-wheel 17, which gear-wheel meshes with the gear-wheel 18, said gear-wheel being mounted upon the short shaft 19, and the gear-wheel 18 meshes with the pinion 20, which pinion is securely attached to the reel-shaft 21, which reel-shaft is journaled in the bars 22, the inner ends of which are pivotally attached at their inner ends, one of said bars being connected to the short shaft 19 and the other one to a similar shaft or bolt located upon the opposite member 1. The object and purpose of pivotally attaching the bars 22 is to provide a common center as between the bars 22 and the gear-wheel 18, by which arrangement the reel-shaft 21 can be moved to or from the shear-plate 23 without interfering with the mesh as between the gear-wheel 18 and the pinion 20.

Upon the reel-shaft 21 are mounted the spiders 24, to the outer ends of which are connected the cutter-blades 25, which cutter-blades are curved in such a manner that as they rotate with the shaft 21 they will produce a shearing cut between said plates and the shear-plate, and for the purpose of producing a better shear cut the cutter-blades 25 are given practically a curve equal to one-half of a circle described by the revolution of said shearing-blades. For the purpose of allowing the bars 22 to be turned upon their pivotal points they are provided with the slots 26, through which slots are passed clamping-bolts 27. After the bars 22 have been properly adjusted with reference to the shear-plate 23 the clamping-bolts 27 are tightened, thereby holding the reel proper in the desired adjustment. The shear-plate 23 is connected to the side members 1 by means of the clamping-bolts 28. It will be understood that owing to the wear of the shear-blade 23 and the cutting-blades 25, and also to compensate for the adjustment of the cutting-reel proper, the angularity of the shear-plate 23 should be changed from time to time, and in order to provide for different angularities of the shear-plate the set-screws 29 and 30 are provided, said set-screws located upon opposite sides of the clamping-bolts 28 and are so located for the purpose of changing the contact-points of the upper face of the shear-plate 23.

For the purpose of supporting the front or forward portion of the frame proper the forward portions of the side members 1 are provided with the small caster-wheels 31, which caster-wheels are journaled upon suitable stud-bolts 32, secured to the adjustable bars 33, which bars are held at the desired point of adjustment by means of the clamping-bolts 34. It will be understood that a caster and its parts are to be connected to each side member 1 of the frame.

Having fully described my invention, what I claim as new, and desire to secure by Letters Patent is—

In a lawn-mower, the combination with a frame, consisting of side members, a main shaft journaled in the side members of the frame, traveling wheels loosely mounted upon the shaft, clutches fixed to the main shaft and adapted for engagement with the traveling wheels, a train of gear-wheels, pivoted bars having journaled to their free ends a reel-shaft, said bars pivoted concentrically with one of the wheels of the train, cutter-blades rotatable with the reel-shaft, a cutter-bar adjustably secured to the side members of the frame, means for holding the cutter-bar in fixed adjustment and means for holding the bars carrying the reel-shaft in fixed adjustment to or from the cutter-bar, substantially as and for the purpose set forth.

In testimony that I claim the above I have hereunto subscribed my name in the presence of two witnesses.

SAMUEL P. LERCH.

Witnesses:
  F. W. BOND,
  JOS. J. HOSLER.